(12) United States Patent
Fiedler

(10) Patent No.: US 9,899,857 B2
(45) Date of Patent: Feb. 20, 2018

(54) METHOD AND APPARATUS FOR START-UP OF A FIELD DEVICE

(71) Applicant: Endress + Hauser Process Solutions AG, Reinach (CH)

(72) Inventor: Marc Fiedler, Reinach (CH)

(73) Assignee: Endress + Hauser Process Solutions AG, Reinach (CH)

( * ) Notice: Subject to any disclaimer, the term of this patent is extended or adjusted under 35 U.S.C. 154(b) by 179 days.

(21) Appl. No.: 14/785,670

(22) PCT Filed: Mar. 26, 2014

(86) PCT No.: PCT/EP2014/056036
§ 371 (c)(1),
(2) Date: Oct. 20, 2015

(87) PCT Pub. No.: WO2014/173602
PCT Pub. Date: Oct. 30, 2014

(65) Prior Publication Data
US 2016/0094057 A1    Mar. 31, 2016

(30) Foreign Application Priority Data
Apr. 24, 2013    (DE) .................. 10 2013 104 139

(51) Int. Cl.
*H01M 10/44* (2006.01)
*H01M 10/46* (2006.01)
(Continued)

(52) U.S. Cl.
CPC .......... *H02J 7/007* (2013.01); *G05B 19/0426* (2013.01); *H02J 7/0029* (2013.01); *G05B 2219/21151* (2013.01); *G05B 2219/24017* (2013.01); *G05B 2219/24028* (2013.01); *G05B 2219/25359* (2013.01); *G05B 2219/25428* (2013.01)

(58) Field of Classification Search
CPC .............................. H02J 7/0068; H02J 7/0013
USPC ..... 320/107, 114, 127, 128, 138; 307/43, 66
See application file for complete search history.

(56) References Cited

U.S. PATENT DOCUMENTS 6,208,924 B1    3/2001  Bauer
8,898,498 B2    11/2014 Seller et al.
(Continued)

FOREIGN PATENT DOCUMENTS

DE    19616293 A1    10/1997
DE    10143493 A1    7/2003
(Continued)

OTHER PUBLICATIONS

Google translate of DE 202011103790 U1 (Nov. 23, 2011).*
(Continued)

*Primary Examiner* — Edward Tso
(74) *Attorney, Agent, or Firm* — Bacon & Thomas, PLLC

(57) ABSTRACT

Method for start-up of a field device, wherein for start-up of the field device an energy storage unit (R) for storing electrical energy is charged by means of a power supply (PS), preferably a power-limited power supply (PS), and wherein the electrical energy stored in the energy storage unit (R) is used to supply the field device at least at times with electrical energy, at least during start-up of the field device.

14 Claims, 1 Drawing Sheet

(51) Int. Cl.
  *H02J 7/00*  (2006.01)
  *G05B 19/042*  (2006.01)

(56) References Cited

U.S. PATENT DOCUMENTS

2009/0027005 A1* 1/2009 Osswald ............... H02J 7/0029
  320/112
2013/0278222 A1 10/2013 Seller et al.

FOREIGN PATENT DOCUMENTS

| | | |
|---|---|---|
| DE | 200223865 U1 | 2/2007 |
| DE | 102009048670 A1 | 3/2011 |
| DE | 102009047538 A1 | 6/2011 |
| DE | 202011103790 U1 | 1/2012 |
| DE | 102010063783 A1 | 6/2012 |

OTHER PUBLICATIONS

English Translation of International Preliminary Report on Patentability, WIPO, Geneva, dated Nov. 5, 2015.
International Search Report EPO, The Netherlands, dated Aug. 18, 2014.
German Search Report, German PTO, Munich, dated Dec. 19, 2013.

* cited by examiner

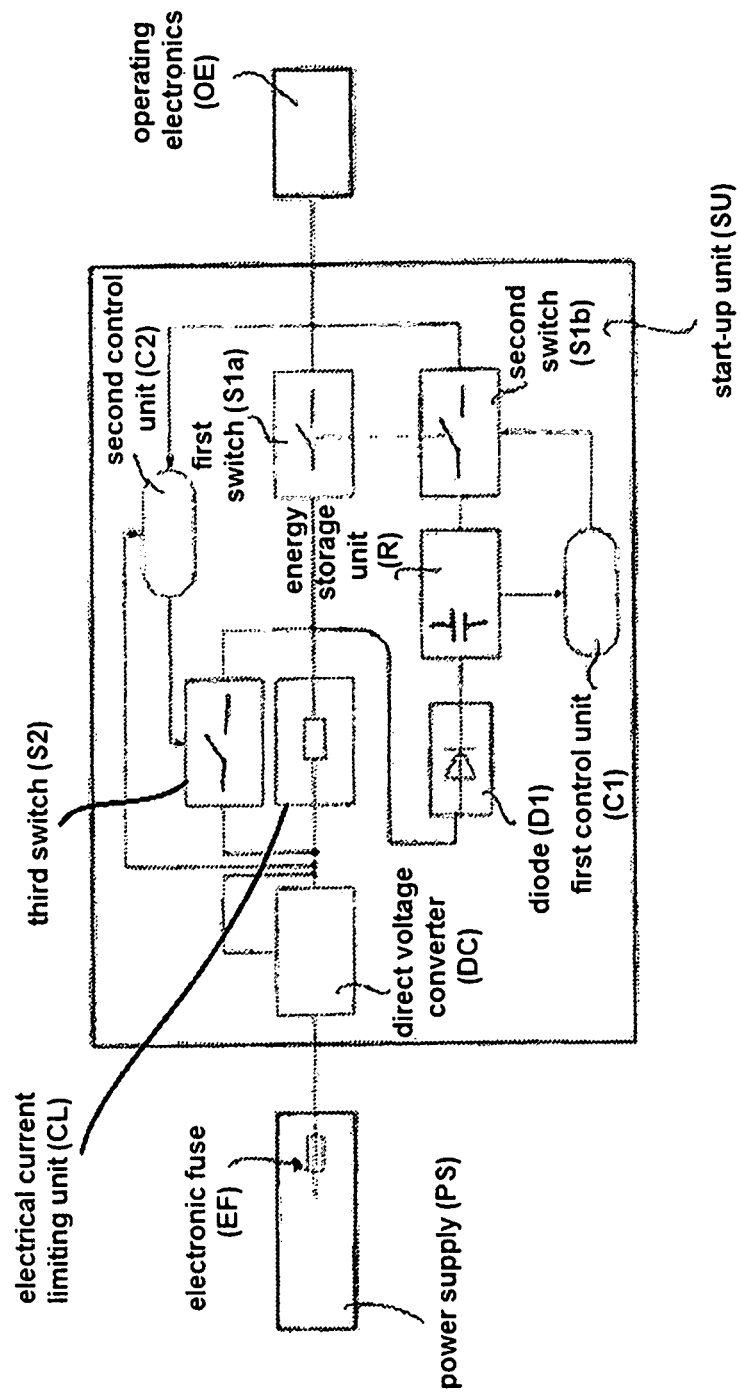

METHOD AND APPARATUS FOR START-UP OF A FIELD DEVICE

TECHNICAL FIELD

The present invention relates to a method for start-up of a field device, to an apparatus for start-up of a field device as well as to a field device.

BACKGROUND DISCUSSION

So-called field devices are often applied in industrial plants for control and/or monitoring of a process running in the plant. The energy supply of these field devices occurs, in such case, for example, via an electrical current loop, to which a field device or a number of field devices are connected. The supply of one or more field devices with electrical energy occurs, in such case, via a feeding device, such as, for example, a power supply, which provides the energy required for operation of the field device, respectively field devices. The energy is provided, for example, in the form of a DC voltage.

Especially in the case of start-up and the therewith connected start procedure of one or more field devices, the field devices exhibit an increased voltage- and/or electrical current requirement. This is caused, for example, by the charging of capacitors present in the field device. An apparatus for start-up of field devices is known, for example, from (laid open international application) Offenlegungsschrift WO 2012000996. By means of a start-up circuit proposed there, the field devices are supplied successively with a voltage provided by a voltage source.

It is known for the energy supply of field devices to use so-called measurement transmitter power supply devices. Such measurement transmitter power supply devices utilize, for example, a grid connection, from which electrical energy is removed and supplied to the field devices. Especially, power supplies are known, which fulfill requirements or explosion protection and have a power-limited release of electrical energy.

This power limiting conflicts, however, with the energy requirement especially during start-up of one or more field devices. For example, field devices have during start-up an increased power requirement. This is caused, for example, such as already mentioned, by the initial charging of capacitors present in the field device. Furthermore, it is required in the case of the start-up initially to load data, for example, into a working memory of the field device, or to execute certain initializing- and self-calibration functions.

It is, thus, in given cases, not possible to start-up a field device, which is connected to a measurement transmitter supply device that is power-limited according to the ignition protection type, intrinsic safety, since the power issued from the feeding device is insufficient for starting the field device.

SUMMARY OF THE INVENTION

It is, thus, an object of the present invention to enable the start-up of a field device, especially in the case of a power-limited supply.

The object is achieved according to the invention by a method for start-up of a field device, by an apparatus as well as by a field device.

A regards the method, the object is achieved by a method for start-up of a field device, wherein for start-up of the field device an energy storage unit or storing electrical energy is charged by means of a power supply, preferably a power-limited power supply, and wherein the electrical energy stored in the energy storage unit is used to supply the field device at least at times with electrical energy, at least during the start-up of the field device.

The terminology, start-up, means, in such case, not only first use, but, instead, also a restart of the field device, such as, for example, a hardware- or software reset, thus a restart of the field device. The field device can be a sensor, an actuator, a display unit or the like equipment serving for control and monitoring of a process. The energy storage unit, which is, for example, a capacitor, serves for storing electrical energy, which is provided to the field device, respectively to an operating electronics of the field device. The energy storage unit can likewise be a component of the field device, respectively the field device electronics. The power supply, by which the energy storage unit is charged, serves, for example, in regular operation of the field device, thus after start-up, respectively the start phase of the field device, to supply the field device with electrical energy, which the field device requires for performing its intended function. The power supply can be, for example, a transformer or a switching power supply. A power limiting of the power supply, such as is required, for example, in the case of use of the field device in an explosion-endangered zone, can be achieved, for example, by a fuse integrated into the power supply, preferably an electronic fuse.

Instead of the power supply, also another voltage source can serve for energy supply of the field device and/or for charging the energy storage unit.

At the point in time of start-up of the field device in the plant, the energy storage unit is, for example, still in its delivery state, which means not, or only partially, charged. After connecting the field device to the power supply, the field device can be supplied with electrical energy from the power supply. It is provided that before electrical energy is transmitted from the power supply to the field device, respectively to the operating electronics of the field device, first of all, at least a part of the electrical energy output from the power supply is stored in the energy storage unit and/or the energy storage unit is at least partially charged. After a predetermined energy amount is present in the energy storage unit, the energy storage unit is thus at least partially charged, the energy stored in the energy storage unit can be provided to the field device. The energy supply of the field device occurs thus after first connecting the field device with the power supply, when a predetermined amount of electrical energy has been stored in the energy storage unit.

In a form of embodiment of the method, a voltage with a first voltage value is output from the preferably power-limited power supply. This voltage output from the power supply can be supplied to a start-up unit, which includes at least the proposed energy storage unit. The start-up unit and energy storage unit can be a part of the field device and/or the operating electronics of a field device, which is connectable to a power supply.

Power supply, respectively the voltage source, as well as also the start-up unit and the operating electronics can also be integrated, for example, in a (single) field device, i.e. field device housing.

In an additional form of embodiment of the method, the electrical energy stored by means of the start-up unit is provided to the field device, when energy sufficient for start-up of the field device is present in the energy storage unit.

There can thus be a matching of the energy storage unit, and its capacity for storing electrical energy, with the requirements of the field device. Especially, the electrical energy present in the energy storage unit can at least partially be provided to the field device, when the electrical energy present in the energy storage unit achieves, respectively exceeds, a predetermined threshold value. It can be provided that this threshold value, as a function of the field device, in which the start-up unit is integrated or with which field device the start-up unit is connected, has a different value, starting from which the energy stored in the energy storage unit is provided to the field device.

In an additional form of embodiment of the method, the start-up unit outputs a voltage with a second voltage value, which is supplied to the field device. For the case, in which the start-up unit is integrated in the field device, the electrical energy present in the energy storage unit is supplied to the operating electronics of the field device. The start-up unit is thus supplied with a voltage with a first voltage value from the power supply, which is, for example, power limited. This first voltage serves then at times, i.e. for a first time span, to charge the energy storage unit of the start-up unit. In a normal operation of the field device following start-up, the voltage output from the power supply then serves for supplying the field device with the required electrical energy. During the charging of the energy storage unit, the operating electronics of the field device, respectively the field device, is not supplied with the voltage output by the power supply, but, instead, is isolated therefrom, for example, by means of a switch. Once the energy storage unit displays a sufficient charge, a voltage with a second voltage value is output from the start-up unit. The first and second voltage values can, in such case, differ from one another.

In an additional form of embodiment of the method, the second voltage value output from the start-up unit is at least at times greater than the first voltage value output from the preferably power-limited power supply. The start-up unit is, thus, enabled to transform the voltage output from a voltage source, at least during the start-up of a field device, and, thus, to use a voltage source for start-up of a field device, which, normally, would not provide sufficient voltage for start-up of a field device.

In an additional form of embodiment of the method, the first as well as also the second voltage values lie below a limit voltage value predetermined by the ignition protection type, intrinsic safety. Preferably, in such case, the second voltage value is higher than the first voltage value. The limit voltage value can be predetermined by the category of the ignition protection of the type, intrinsic safety, for which the field device is designed and is suited. The corresponding limit voltage values are given in the standard IEC 60079-11 relevant for the ignition protection type, intrinsic safety.

In an additional form of embodiment of the method, there is provided to the field device, at least during start-up, at least partially, both electrical energy stored in the energy storage unit as well as also, at least partially, the electrical energy output from the power supply. After the energy storage unit is at least partially charged, the electrical energy stored in the energy storage unit can be provided to the field device. At the same time, electrical energy output from the power supply can be provided to the field device. To this end, a first energy supply path can be provided, via which the field device is connected with the power supply and, furthermore, a second energy supply path can be provided, via which the field device is connected with the energy storage unit. The first and second energy supply paths can also partially overlap.

In an additional form of embodiment of the method, the electrical energy transferred during start-up from the power supply to the field device is limited, preferably by means of an electrical current limiting unit, which is especially preferably a part of the start-up unit. The electrical current limiting unit is preferably a resistor.

In an additional form of embodiment of the method, an intended operating mode of the field device following on the start procedure of the field device is detected, preferably by means of the start-up unit, by comparing the voltage output by the start-up unit with the voltage supplied to the electrical current limiting unit. To this end, corresponding voltage taps and a corresponding measuring apparatus can be provided for the comparison.

In an additional form of embodiment of the method, after reaching the intended operating mode of the field device, the power supply is used exclusively for energy supply of the field device. Preferably, in such case, the voltage output from the power supply and a voltage directly derived therefrom is used exclusively for energy supply of the field device.

In an additional form of embodiment of the method, after reaching the intended operating mode, in which the field device has preferably an essentially constant voltage requirement, the electrical current limiting unit is shunted.

In an additional form of embodiment of the method, the voltage output from the power supply is converted from a first voltage value preferably by means of a direct voltage converter to a third voltage value, which is supplied to the electrical current limiting unit.

As regards the apparatus, the object is achieved by an apparatus comprising a chargeable energy storage unit for start-up of a field device, wherein the energy storage unit serves to supply the field device at least during start-up of the field device at least at times with electrical energy. In a form of embodiment of the apparatus, the apparatus includes, furthermore, a preferably power-limited power supply, which serves for charging the energy storage unit.

As regards the field device, the object is achieved by a field device for use in an apparatus according to one of the aforementioned forms of embodiment.

BRIEF DESCRIPTION OF THE DRAWING

The invention will now be explained in greater detail based on the appended drawing, the sole FIGURE of which shows as follows:

FIG. 1 is a block diagram of a power supply connected with a start-up unit which, in turn, is connected with a field device, respectively a component of a field device.

DETAILED DISCUSSION IN CONJUNCTION WITH THE DRAWING

The power supply PS shown in FIG. 1 is a direct voltage source, which in the example of an embodiment shown here is power limited. The power limiting is enabled, in such case, by an electronic fuse EF, which limits the electrical current withdrawable from the direct voltage source. Thus, this electronic fuse limits the power withdrawable from the power supply PS.

The electronic fuse EF can thus serve especially for limiting the electrical current withdrawable from the power supply PS. Especially, the limiting can be to a threshold value below a limit value predetermined by the ignition protection type, intrinsic safety. The power limiting of the power supply PS can occur especially by turning off the power supply PS upon reaching a minimum electrical current value or by an electrical current limiting by means of a resistor.

Many field devices, however, require at start-up for a short time significantly more electrical current as compared to later operation. This initial current is usually referred to as the starting current. It can thus happen that field devices, whose starting current exceeds the maximum deliverable electrical current of a power supply, such as, for example, a power supply PS for the Ex-region, cannot be started, even though the allowable characteristic values for operation in the Ex-region are not exceeded. In order, in spite of this, to provide the power required for the start-up of a field device, an energy storage unit R is provided in the start-up unit.

The energy storage unit R serves to provide the power required for start-up quickly, without, however, exceeding the maximum power limit predetermined by the ignition protection type, intrinsic safety. After connecting the start-up unit SU with the power supply PS or another direct voltage source, the energy required for starting the field device is first stored in an energy storage unit R. Only after the energy storage unit R contains sufficient energy is the energy storage unit R, respectively the output of the start-up unit SU, released to the field device. The power, in such case, output from the start-up unit SU to the field device, is, in such case, limited corresponding to the limit values of the ignition protection type, intrinsic safety. The actual starting of the field device, respectively the energy supplying of the field device, occurs thus only after the energy storage unit R is charged to a predetermined value.

The start-up unit SU shown in FIG. 1 is, in such case, constructed as follows. The voltage withdrawn from the power supply PS is converted by a direct voltage converter to a DC voltage value DC, which serves in the normal operation of the field device for operating the field device. For example, it can be provided that the direct voltage converter DC, depending on field device connected to the output of the start-up unit SU, outputs different voltage values, such as, for example, voltage values of 9V, 10V or 11V, as a function of the connected field device.

Provided between the direct voltage converter DC and the output of the start-up unit SU is an electrical current limiter CL and a first switch S1a. The electrical current limiter is, in such case, shuntable by means of a second switch arranged parallel to electrical current limiter. Provided between the electrical current limiter and the first switch S1a is a tap, which is connected via a diode D1 and an energy storage unit R in the form of a capacitor as well as a second switch S1b with the output of the start-up unit SU.

Additionally, there is provided a first control unit C1, which monitors the electrical energy present in the energy storage unit R and, in given cases, actuates the second switch S1b, so that after a certain value of the electrical energy stored in the energy storage unit R has been reached, the second switch S1b is closed and the energy stored in the energy storage unit R is made available to the output of the start-up unit SU.

The first switch S1a and the second switch S1b are, in such case, preferably switchable by means of the first control unit C1, so that the first control unit C1 serves to switch the first switch S1a and the second switch S1b.

The voltage present at the output of the start-up unit SU is read by means of a second control unit C2, and the switch serving for shunting the electrical current limiting unit CL is switchable by means of the second control unit C2. To this end, taps are provided on the output of the start-up unit SU as well as between the direct voltage converter DC and the electrical current limiting unit CL, which serve for comparing the voltage from the direct voltage converter DC and that on the output of the start-up unit SU. By measuring the voltage drop across the electrical current limiter CL, which is, for example, an ohmic resistor, it can, thus, be detected, how large the voltage drop across the electrical current limiting unit CL is and, in such case, the power requirement of the field device deduced. This power requirement, as already mentioned, increases during start-up of the field device and is essentially constant during normal operation of the field device. If thus an essentially constant voltage drop occurs across the electrical current limiting unit CL, the second control unit C2 can actuate the switch S2 for shunting the electrical current limiting unit, so that the electrical current limiting unit CL is shunted and the voltage output from the direct voltage converter DC is available to the output of the start-up unit SU.

For start-up of the field device, the first and second switches S1a and S1b are thus opened, so that the energy storage unit R is charged by the power supply PS, until a sufficient charging of the energy storage unit R is detected by means of the first control unit C1 and the first switch S1a and the second switch S1b are then closed.

After normal operation of the field device has been detected by means of the second control unit C2, switch S2 is also closed for shunting the electrical current limiting unit, so that the voltage provided from the power supply PS and the direct voltage converter DC is available to the field device on the output of the start-up unit SU.

The voltage converter DC can, furthermore, have a feedback path, via which the voltage output by the voltage converter DC is controlled to a predetermined voltage value.

The start-up unit can be, for example, a component of a field device or be embodied in the form of an adapter, i.e. an apparatus, which can be connected, for example, to the power supply, to the field device or between the power supply and the field device.

The invention claimed is:

1. A method for start-up of a field device, comprising:
  charging an energy storage unit for storing electrical energy, the energy storage unit being charged by means of a power-limited power supply; and
  using the electrical energy stored in the energy storage unit to supply the field device at least at times with electrical energy, at least during start-up of the field device, wherein:
  the electrical energy transferred during start-up from the power supply to the field device is limited, by means of an electrical current limiting unit, which is especially a part of the start-up unit.

2. The method as claimed in claim 1, further comprising:
  outputting a voltage with a first voltage value from said power-limited power supply, which voltage is supplied to a start-up unit, which includes at least the energy storage unit.

3. The method as claimed in claim 2, wherein:
  the electrical energy stored by means of the start-up unit is provided to the field device, when energy sufficient for start-up of the field device is present in the energy storage unit, when the electrical energy present in the energy storage unit achieves, respectively exceeds, a predetermined threshold value.

4. The method as claimed in claim 3, wherein:
  the start-up unit outputs a voltage with a second voltage value, which is supplied to the field device.

5. The method as claimed in claim 4, wherein:
  the second voltage value output from the start-up unit is at least at times greater than the first voltage value output from said power-limited power supply.

6. The method as claimed in claim 5, wherein:

the first as well as also the second voltage values lie below a limit voltage value predetermined by the ignition protection type, intrinsic safety, said limit voltage value is predetermined by the category of ignition protection type, for which the field device is suited.

7. The method as claimed in claim 1, wherein:

there is provided to the field device, at least during start-up, both electrical energy stored in the energy storage unit as well as also electrical energy output from the power supply.

8. The method as claimed in claim 1, wherein:

an intended operating mode of the field device following on the start procedure is detected, by means of the start-up unit, by comparing the voltage output from the start-up unit with the voltage supplied to the electrical current limiting unit.

9. The method as claimed in claim 1, wherein:

after reaching the intended operating mode, power supply is used exclusively for energy supply of the field device, in the intended operating mode.

10. The method as claimed in claim 1, wherein:

after reaching the intended operating mode, in which the field device has an essentially constant voltage requirement, the electrical current limiting unit (CL) is shunted.

11. The method as claimed in claim 1, wherein:

the voltage output from the power supply is converted from a first voltage value by means of a direct voltage converter to a third voltage value, which is supplied to the electrical current limiting unit.

12. An apparatus, comprising:

a chargeable energy storage unit for start-up of a field device, wherein:

said energy storage unit serves to supply the field device at least during start-up of the field device at least at times with electrical energy; and the electrical energy transferredduring start-up from the power supply to the field device is limited, by means of an electrical current limiting unit, which is especially a part of the start-up unit.

13. The apparatus as claimed in claim 12, further comprising:

a power-limited power supply, which serves for charging the energy storage unit.

14. A field device for use in an apparatus, comprising: a chargeable energy storage unit for start-up of a field device, wherein: said energy storage unit serves to supply the field device at least during start-up of the field device at least at times with electrical energy; wherein:

the electrical energy transferred during start-up from the power supply to the field device is limited, by means of an electrical current limiting unit, which is especially a part of the start-up unit.

* * * * *